United States Patent Office 3,179,485
Patented Apr. 20, 1965

3,179,485
PROCESS FOR GRAFTING A VINYL COMPOUND HAVING EPOXY GROUPS ONTO POLYPROPYLENE FIBERS
Shigeo Kawasaki, Suginami-ku, Tokyo, Japan, assignor to Shin Nippon Chisso Hiryo Kabushiki Kaisha, Osaka, Japan, a corporation of Japan
No Drawing. Filed Mar. 1, 1961, Ser. No. 92,439
Claims priority, application Japan, Mar. 2, 1960, 35/6,900
8 Claims. (Cl. 8—115.5)

The present invention relates to a process for preparing readily dyeable polypropylene fibers by ultraviolet ray irradiating polypropylene fibers in air or in vacuo in the presence of a sensitizer, graft polymerizing with monomeric vinyl compounds having epoxy groups together with or without other vinyl compounds, and treating the fibers with a mixture solution of water dissolving oxyamines or sodium salts of amino acids and dimethylformamide.

Polypropylene fibers are cheaper and have superior properties, comparing with the other synthetic fibers, but are hardly dyeable with familiar dyes with the result that the use for clothing is hindered. We have not yet had effective processes in spite of various strenuous efforts to provide affinity for dyes in order to improve dyeability of polypropylene.

An object of the present invention is to provide an effective and a simple process for rendering polypropylene fibers readily dyeable. The other object of the present invention is to provide dye affinity to polypropylene fibers without harming properties of the fibers. Another object of the present invention is to render polypropylene fibers mixed spun or mixed woven with the other natural, regenerated, acetate-, acrylonitrile-, polyester-, or vinyl alcohol-synthetic fibers which have different dyeabilities, dyeable.

According to the present invention, polypropylene fibers are irradiated by ultraviolet ray in the presence of sensitizers in air or in vacuo to form so called active center or a point where graft polymerization can be effected, and then the irradiated fibers are subjected to graft polymerization with monomeric vinyl compounds having epoxy groups together with or without other vinyl compounds. After polymerization, the fibers are treated with a mixture solution of water dissolving oxyamines or sodium salts of various amino acids and dimethyl formamide.

The sensitizer or a ultraviolet ray absorber is a compound such as acetophenone, benzophenone and commercial products of the trade name "Nvinul" which are nearly pure substituted benzophenones containing only traces of inorganic salts. It is used in an amount of the 0.1–1% by weight of polypropylene. The compounds are dissolved in organic solvents such as, for example, alcohol, ether, chloroform, benzene, toluene, xylene, dioxane or tetrahydrofuran and then the solution may be applied to polpropylene fibers having appropriate denier. Alternatively, the sensitizer may be added to a solution of polypropylene to form a homogeneously dispersing spinning solution and then extruded in a coagulation bath to form fibers.

The fibers are subjected to ultraviolet ray irradiation in air, oxygen, air rich in molecular oxygen or vacuum to form a radical. Properties of graft polymer obtained in the subsequent step depend on relative density of active centers formed by means of ultraviolet ray along polypropylene chain. The ultraviolet ray source may be mercury lamp commonly used. The irradiation may be effected at room temperature for from 30 minutes to 2 hours. We are not sure how the reaction proceeds under ultraviolet ray in the presence of the sensitizer, but it would be considered that formation of free radical is accelerated in polypropylyene chain.

The irradiated fibers are then graft polymerized with monomeric vinyl compounds having epoxy groups such as, for example, glycidylmethacrylate, glycidylacrylate or glycidylurethane. Alternatively, the fibers may be graft polymerized with a mixture of such a vinyl compound having epoxy groups and other vinyl compounds such as, for example, vinyl acetate, methylmethacrylate or acrylonitrile.

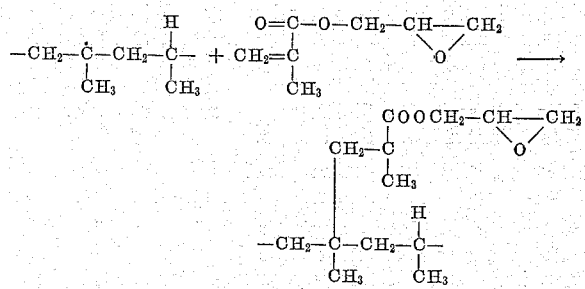

The vinyl compounds to be graft polymerized are used in such an amount that weight increase of the polypropylene fibers is less than 30%, preferably 20–30%.

The polymerization may be carried out in any conventional manner.

The produced graft polymer is then treated with a mixture solution of water dissolving oxyamines or sodium salts of amino acids and dimethylformamide, thereby to render hydrophobic.

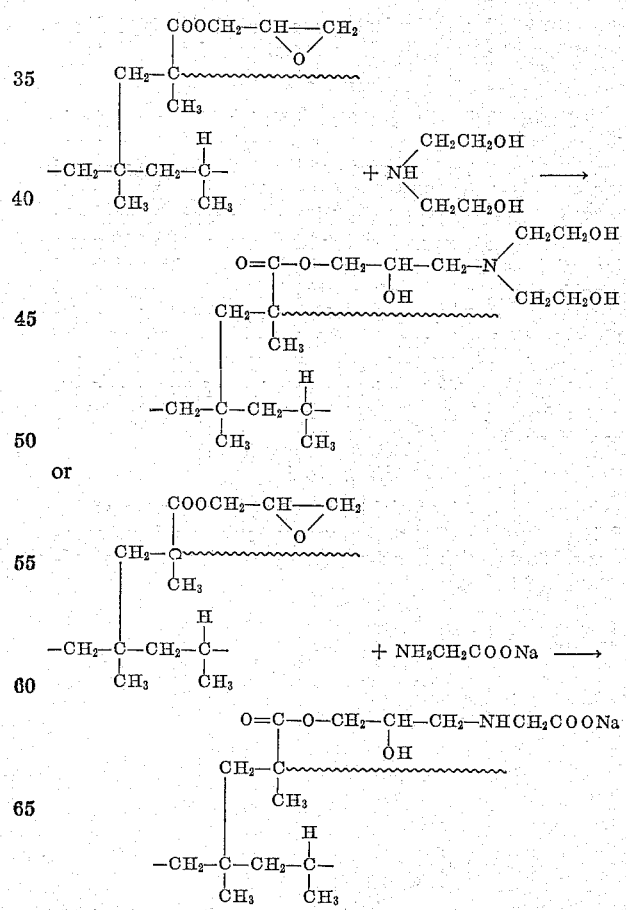

The oxyamines are, for example, diethanol amine, and the amino acids are, for example, monoamino carboxylic acid such as glycine and alanine; monoamino dicarboxylic acid such as glutamic acid; and diaminomonocarboxylic acid such as lysine. Water dissolving the oxyamines or amino acid salts and dimethylformamide may be mixed in the range of 30–70 to 70–30 by weight, and concentration of the oxyamines or amino acid salts in the mixture solution may be 30–50% by weight. The present treatment may be effected by dipping the graft polymerized fibers into the solution at the boiling point of the solution for about 5 or 6 hours. Dimethylformamide works to produce addition of the amino compounds to the epoxy groups.

The thus treated polypropylene fibers have a good hydrophobic property and can be dyed readily in and in any deep by acid dyes, basic dyes, direct dyes or the like as shown in the examples hereinunder. Mixed spun or woven articles of the polypropylene fibers and the other natural, regenerated, acetate-, acrylonitrile-, polyester-, or vinyl-alcohol synthetic fibers may readily be dyed. The following examples illustrate the present invention but do not limit the invention thereto.

*Example 1*

Polypropylene fibers were treated with an alcoholic acetophenone solution so that acetophenone adhered to the fibers to an extent of 0.2% by weight. The fibers were irradiated with mercury resonance of 2537 A. from a low pressure mercury lamp for 50 min. at room temperature. The fibers then had added thereto 25 parts by weight of glycidylmethacrylate per 100 parts of the fibers and then heated at 40–50° C. for 60 minutes to produce 125 parts of graft polymer. The polymer was treated with a 35% solution of diethanolamine dissolved in a mixture solution of water and dimethyl formamide (30:70), at boiling point of the solution for 60 minutes. The produced polypropylene fibers were dip dyed by direct dyes, acid dyes, basic dyes or the like and showed good dyeability. Physical properties of the dyed fibers were almost same with those of fibers before dyeing.

*Example 2*

Polypropylene fibers were treated with an alcoholic benzophenone solution so that benzophenone homogeneously adhered to the surface of the fibers to an extent of 0.5% by weight. The fibers were irradiated in air with 2537 A. mercury resonance from a low pressure mercury lamp at room temperature for 30 minutes. To 100 parts by weight of the fibers were added 30 parts by weight of glycidylacrylate and graft polymerized at from room temperature to 60° C. for 80 minutes to produce 125 parts by weight of polymer. The polymer was boiled for 60 minutes in a 40% solution of sodium salt of glycine dissolved in a 50:50 mixture solution of water and dimethylformamide. The fibers showed good dyeability to various dyes as in Example 1.

*Example 3*

To 100 parts by weight of polypropylene were added 0.5 part by weight of acetophenone to form a homogeneous mixture which was melt spun to produce polypropylene fibers. The fibers were irradiated with 2537 A. mercury resonance from a low pressure mercury lamp in vacuo at room temperature for 40 minutes. To 100 parts by weight of the fibers were added 20 parts by weight of glycidylmethacrylate and 5 parts by weight of methylmethacrylate and then kept at from room temperature to 60° C. for 60 minutes. The fibers were boiled for 70 minutes in a 30% solution of sodium salt of alanine in a 70:30 mixture solution of water and dimethylformamide. The produced fibers had good dyeability. No substantial difference in physical properties between fibers before and after dyeing, could be observed.

What I claim is:

1. Process for improving dyeability of polypropylene fibers which comprises
    (1) ultraviolet irradiating polypropylene fibers in the presence of 0.1 to 1% by weight, relative to the polypropylene, of photosensitizer,
    (2) graft polymerizing said fibers with monomeric vinyl compound having epoxy groups, and
    (3) treating the resultant fiber with a mixture of dimethylformamide and water containing in solution a member selected from the group consisting of oxyamines and salts of amino acids.

2. A process according to claim 1, wherein irradiation is carried out in atmospheric condition for from 30 minutes to 2 hours.

3. A process according to claim 1 wherein irradiation is carried out in vacuo for from 30 minutes to 2 hours.

4. A process according to claim 1 wherein graft polymerization is effected with a mixture of vinyl compounds having epoxy groups and other vinyl compounds.

5. A process according to claim 1 wherein the dimethylformamide containing solution is a 30–50% solution of a member selected from the group consisting of oxyamines and amino acid salts, and water to dimethylformamide is 30–70 to 70–30 by weight.

6. A process according to claim 1 wherein the graft polymerization is carried out with such an amount of vinyl compounds that weight increase of polypropylene fibers is 20–30%.

7. A process according to claim 1 wherein the photosensitizer is acetophenone.

8. A process according to claim 1 wherein the photosensitizer is benzophenone.

References Cited by the Examiner

UNITED STATES PATENTS

| | | | |
|---|---|---|---|
| 2,484,529 | 10/49 | Roedel | 204—162 |
| 2,903,381 | 9/59 | Schroeder | 117—161 |
| 2,999,772 | 9/61 | Burk et al. | 204—158 |
| 3,020,174 | 2/62 | Natta et al. | 117—47 |
| 3,022,191 | 2/62 | Cappuccio et al. | 204—154 |
| 3,058,950 | 10/62 | Stanton et al. | 204—154 |
| 3,079,312 | 2/63 | Alsys | 204—154 |

MURRAY TILLMAN, *Primary Examiner.*

J. R. SPECK, J. H. MACK, *Examiners.*